United States Patent Office 3,094,530

Patented June 18, 1963

1

3,094,530

5-AZIDOCARBONYL PYRAZINAMIDE

Humphrey I. X. Mager, 34 de Ruyterstraat, Leidschendam, Netherlands; Wouter Berends, 5A Kanaalweg, Delft, Netherlands; and Willem J. Schut, 6 Tulpencroftlaan, Heiloo, Netherlands No Drawing. Filed Feb. 1, 1961, Ser. No. 86,294
1 Claim. (Cl. 260—250)

The present invention relates to new and novel derivatives of pyrazine 2,5-dicarboxylic acid and relates more particularly to compounds of the following formula:

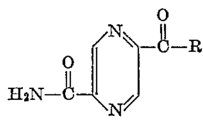

wherein R is a hydrazino or azido group. These compounds are useful as analeptics and as intermediates in the production of other compounds containing a pyrazine nucleus.

In our application entitled "Substituted Pyrazine Dicarboxylic Acid Derivatives," Ser. No. 86,295, we have described the preparation of 2-carbamoyl-5-(lower alkoxy)carbonylpyrazines of the formula:

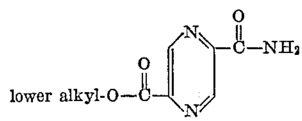

by the treatment of 2,5-di(lower alkoxy)carbonylpyrazines with ammonium hydroxide in alcoholic solution. The 2,5-di(lower alkoxy)carbonylpyrazines are themselves prepared from pyrazine 2,5-dicarboxylic acid by catalytic esterification with a lower aliphatic alcohol in the presence of concentrated sulfuric or hydrochloric acid as the catalyst.

It has now been found that the treatment of 2-carbamoyl-5-(lower alkoxy)carbonylpyrazines with hydrazine hydrate in ethanol yields 2-carbamoylpyrazine 5-carboxyhydrazides which may, in turn, be converted to the azides by treatment with sodium nitrite in aqueous acid solution at a low temperature, preferably 0° C. to 5° C.

2

In order further to illustrate this invention but without being limited thereto, the following examples are included:

*Example I*

A quantity of 1.56 g. (0.008 mol) 2-carbamoyl-5-ethoxycarbonylpyrazine and 100 ml. 99% ethanol are heated to boiling and 1.8 ml. hydrazine hydrate are added to the boiling solution. The mixture is refluxed with stirring for 5 minutes and allowed to cool to −5° C.

The yellow precipitate is recovered by filtration, washed three times with 10 ml. portions of 96% ethanol and dried in a vacuum desiccator over phosphorous pentoxide. Yield: 1.44 g. (99%).

A 150 mg. sample is recrystallized from 20 ml. water to yield pure 2-carbamolypyrazine 5-carboxyhydrazide as yellow needles, melting point 299–299.5° C. (dec.).

*Example II*

3.2 g. sodium nitrite is dissolved in 25 ml. water and to the solution is added 1.44 g. 2-carbamoylpyrazine 5-carboxyhydrazide. The suspension is cooled in an ice-salt bath and 16 ml. 5 N HCl are added dropwise, with stirring, while the temperature of the mixture is maintained between 0° C. and 5° C. After the addition of HCl is complete, the then colorless mixture is stirred for 10 minutes.

The white flocculent precipitate is filtered off, washed 4 times with 10 ml. portions of ice-cold water until free of chloride ions and finally is dried in a vacuum desiccator over concentrated $H_2SO_4$ and pellets of KOH.

Yield: 1.40 g. (91%) of 2-carbamoylpyrazine 5-carboxylic acid azide.

It is understood that the foregoing detailed description is given merely by way of illustration and that many variations may be made therein without departing from the spirit of our invention.

Having described our invention, what we desire to secure by Letters Patent is:

2-carbamoylpyrazine 5-carboxylic acid azide.

References Cited in the file of this patent

UNITED STATES PATENTS 2,149,279 Dalmer -------------- Mar. 7, 1939

OTHER REFERENCES

Spoerri et al.: J. Amer. Chem. Soc., vol. 60 (1938), pages 400–2.